United States Patent [19]
Kollander

[11] 3,885,271
[45] May 27, 1975

[54] TOOL FOR SCRAPING AND CUTTING

[76] Inventor: Alfred A. Kollander, 314 S. Third St., Stillwater, Minn. 55082

[22] Filed: July 18, 1973

[21] Appl. No.: 380,483

[52] U.S. Cl. ............................ 17/69; 17/19; 7/1 H; 30/136; 7/14.1 R
[51] Int. Cl. ............................ A22b 5/10; A22b 5/16
[58] Field of Search ............... 17/66, 67, 68, 69, 19; 30/123 R, 121.5, 136, 355; 7/1 H, 14.1 R

[56] References Cited
UNITED STATES PATENTS

| | | | |
|---|---|---|---|
| 486,295 | 11/1892 | Pflueger | 17/69 |
| 1,728,192 | 9/1929 | Wellington | 30/355 X |
| 1,935,149 | 11/1933 | Elvin | 17/68 |
| 2,298,873 | 10/1942 | Dalkowitz | 30/355 X |
| 2,434,550 | 1/1948 | Daniel | 7/1 H |
| 2,536,065 | 1/1951 | Kollander | 17/66 |

Primary Examiner—George J. Marlo
Attorney, Agent, or Firm—Jacobson and Johnson

[57] ABSTRACT

A spoon-like device having an inverted bowl section contains undulations around the periphery of the bowl portion to serve as scraping teeth and has an upwardly angulated handle. Along one edge of the bowl section portion to the right or left of the handle, the undulations are flattened to form a cutting edge and the handle has a notch at its upper end for use in pulling out hooks or the like.

3 Claims, 3 Drawing Figures

PATENTED MAY 27 1975  3,885,271

TOOL FOR SCRAPING AND CUTTING

BACKGROUND OF THE INVENTION

1. Field of the Invention

This invention is directed for use as a tool for scraping and cutting articles having a relatively soft texture such as fish, fruits, vegetables and the like.

2. Description of the Prior Art

The instant invention is a modification of a device which is described in U.S. Pat. No. 2,536,065. The instant invention is a more versatile product which can be used for a variety of different functions and purposes in addition to the function of scaling fish as described in the aforementioned patent. For example, when cleaning fish, with the instant invention it is no longer necessary to lay down the scraper when it is desired to cut off or cut into some part of the fish because a handy cutting edge is now provided. This enables the operator to use the same tool to cut open the fish or cut off fins or remove other undesirable parts when cleaning a fish.

SUMMARY

The spoon-like scraping device has an inverted bowl section and an upwardly angulated handle with scraping teeth formed around the periphery of the spoon section and a cutting edge is provided along the right or left hand edge of the bowl section along with a notch formed at the upper end of the handle to make the tool handy for all phases of fish cleaning operations and other scraping, cutting and cleaning tasks.

DESCRIPTION OF THE PREFERRED EMBODIMENT

Figure 1:
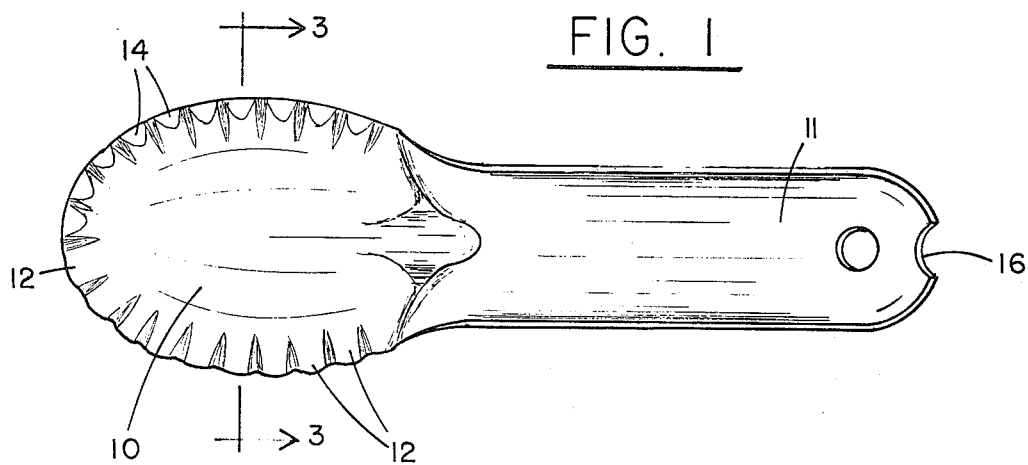
FIG. 1 is a top plan view of the invention.
Figure 2:
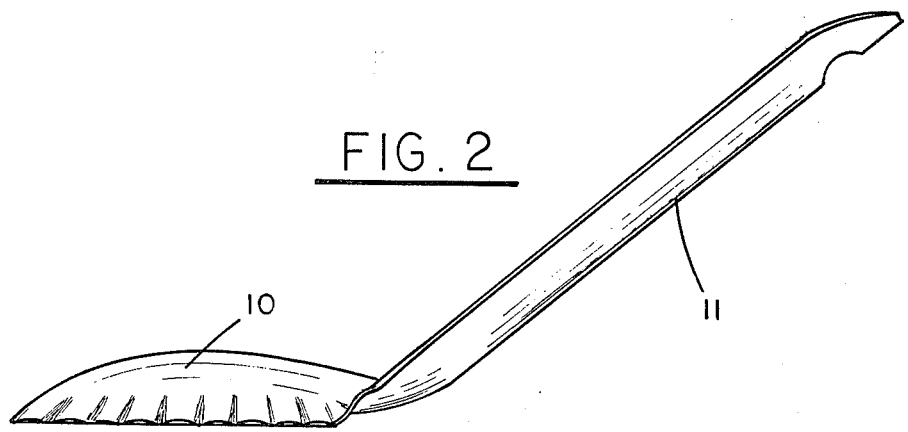
FIG. 2 is a side elevational view of the same.

The device which is made out of some suitable stiff material such as stainless steel or aluminum or the like comprises a cutting and scraping section or body 10 with an attached upwardly angulated elongated handle 11. Preferably the two sections are stamped out of one single sheet of metal. The scraping and cutting section 10 is in the form of an inverted bowl portion of a spoon and contains a continuing series of undulations 12 around its periphery. As described in greater detail in the aforementioned patent, the undulations 12 constitute scraping teeth formed by the peaks and valleys of the undulations. For example, for use when cleaning scales off fish, the scraping body 10 is placed with the bowl facing downward on the body of the fish and it is slid right or left over the fish body. The valleys in the undulations go under the fish scales and lift them up and as the tool slides along, the fish scales come over the top of the outer surface of the bowl portion 10 and are thereby removed from the fish body. It should be understood that this is not intended to be a rigorous and detailed analysis of the operation of the tool as a fish scraper but is only intended to give a general idea of how it functions as a tool for scaling fish.

Figure 3:
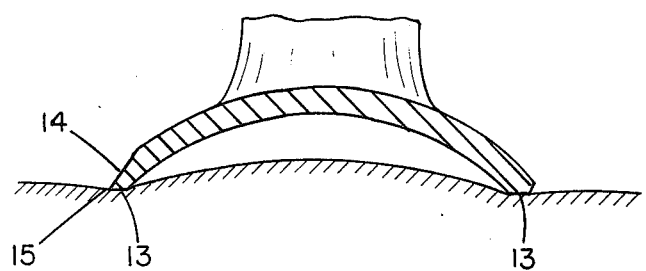
FIG. 3 is a cross section taken approximately on line 3—3 of FIG. 1.

As can be observed most clearly in FIG. 3, the underside of the periphery of the bowl section 10 is flattened as at 13 for the purpose of providing the tool with a guide surface for resting in a suitable fashion on the surface of the article being worked on.

Although heretofore the device is described as being used for scaling fish, it should be understood that it can be and is used for other functions and purposes. For example, it has been used for scraping corn cobs to remove the kernels from the cobs without cutting or damaging them. It has also been used even for scraping down callouses from a person's feet or hands. But it has found its most popular use for cleaning fish. In the past, when used for that purpose, its function was limited because when it was necessary to cut the fish for removing fins or other parts or to open the fish to clean out the inside, the scraping tool was laid down and some type of cutting tool had to be picked up to be used. As can be observed in FIG. 3, along one edge (which in the drawing is the edge to the right of the handle 11) the undulations along the outer surface of the periphery of the inverted bowl area 10 are flattened down as at 14 by milling or some type of grinding operation to form a sharp cutting edge 15 with the flattened underside 13 of the bowl section. This cutting edge 15 is then used for any number of purposes when working on various articles and especially when cleaning fish for cutting off fins or other parts or for slicing open the body of the fish to clean the inside. In this fashion, then, the single tool provides both the scraping and the cutting functions so necessary in the overall cleaning of certain articles and particularly for cleaning fish.

In addition, there is formed at the upper end of handle 11 a notch 16 which is also useful in the cleaning of fish and other articles. For example, after a fish is caught and it is necessary to remove a deeply imbedded hook from the mouth or inside of the fish, the handle 11 is inserted into the mouth of the fish and the notch 16 is used to latch onto some portion of the fish hook in order to pull it out of the fish's mouth. This added feature makes the tool that much more useful for cleaning operations which may involve cutting, scraping, and other steps.

I claim:

1. A scraping and cutting tool, comprising in combination: a spoon-like device having an inverted bowl section and an upwardly angulated attached handle made out of substantially stiff inflexible material; the periphery of the bowl portion containing undulations constituting scraping teeth having sharp edges separated from each other by distinctly blunt edges; the underside of the periphery of the bowl portion being flat for providing a guiding surface for scraping; and approximately one-half of the peripheral edge of said bowl portion including a distinctly sharp cutting edge which is continuously and uniformly sharp along the entire length thereof.

2. The invention as set forth in claim 1 wherein the one edge is either to the right or to the left of the handle.

3. A fish cleaning tool, comprising in combination: a spoon-like device having an inverted bowl section and an upwardly angled attached handle made out of substantially stiff inflexible material; a continuous series of alternating peaks and valleys formed in the outer surface along the periphery of the bowl section, the valleys constituting teeth having sharp edges separated from each other by distinctly blunt edges of said peaks for getting under fish scales and scraping them loose so they pass between and over the peaks; the underside of the periphery of the bowl section being flattened to provide a guiding surface when scaling fish; and approximately one-half of the peripheral edge of said bowl portion including a distinctly sharp cutting edge which is continuously and uniformly sharp along the entire length thereof.

* * * * *